United States Patent
Fischer et al.

(10) Patent No.: US 6,519,711 B1
(45) Date of Patent: Feb. 11, 2003

(54) METHOD AND APPARATUS FOR CONTROLLING A CLOCKED CIRCUIT HAVING A REGISTER FOR STORING A BIT RECEIVED FROM AN INPUT TERMINAL AND AN OUTPUT TERMINAL CONNECTED TO CLOCK TERMINAL OF THE CLOCKED CIRCUIT

(75) Inventors: Frederick H. Fischer, Macungie, PA (US); Srinivasa Gutta, Allentown, PA (US); Vladimir Sindalovsky, Perkasie, PA (US)

(73) Assignee: Agere Systems, Inc., Berkeley Heights, NJ (US)

( * ) Notice: Subject to any disclaimer, the term of this patent is extended or adjusted under 35 U.S.C. 154(b) by 0 days.

(21) Appl. No.: 09/409,309

(22) Filed: Sep. 29, 1999

(51) Int. Cl.[7] .............................. G06F 1/04; G06F 1/09; H03K 19/003

(52) U.S. Cl. .......................... 713/500; 713/600; 714/30

(58) Field of Search ................................. 713/500, 600; 714/30, 731, 732, 733, 742; 716/4

(56) References Cited

U.S. PATENT DOCUMENTS

| | | | | |
|---|---|---|---|---|
| 4,933,774 A | * | 6/1990 | Ishimaru ...................... | 386/84 |
| 5,905,406 A | * | 5/1999 | Sugden et al. ............... | 329/312 |
| 5,907,367 A | * | 5/1999 | Edwards et al. ............ | 348/501 |
| 5,987,244 A | * | 11/1999 | Kau et al. .................... | 713/500 |
| 6,014,752 A | * | 1/2000 | Hao et al. .................... | 713/500 |

* cited by examiner

Primary Examiner—Thomas Lee
Assistant Examiner—Suresh K Suryawanshi
(74) Attorney, Agent, or Firm—Synnestvedt & Lechner LLP

(57) ABSTRACT

A method and apparatus for controlling a clock of a component of an integrated circuit for testing purposes. The clock is controlled on a hardware level. Specifically, a stepped clocking technique is provided by which a processor can advance the clock signal of a component one bit at a time or in rapid bursts of successive bits. This provides for operation of the accelerator block in increments of half-clock cycles (bit by bit). The accelerator block can be stopped during processing of the dataset. Registers of the accelerator block can then be interrogated by the processor, which continues to operate at full clock speed, to determine how the accelerator block is processing the data.

19 Claims, 2 Drawing Sheets

METHOD AND APPARATUS FOR CONTROLLING A CLOCKED CIRCUIT HAVING A REGISTER FOR STORING A BIT RECEIVED FROM AN INPUT TERMINAL AND AN OUTPUT TERMINAL CONNECTED TO CLOCK TERMINAL OF THE CLOCKED CIRCUIT

FIELD OF THE INVENTION

This invention relates generally to testing of integrated circuitry, particularly electronic circuitry incorporating a hardware accelerator block. More particularly, the invention relates to system-on-a-chip circuitry.

BACKGROUND OF THE INVENTION

Electronic devices employ integrated circuitry. Some complex integrated circuitry, such as system-on-a-chip ("SOC") devices, have at least one processor block and at least one hardware accelerator block. While the processors are programmable to perform various functions, the accelerator blocks are designed to perform a specific function. Rather than perform a particular function on a dataset, a processor may simply send the dataset to an accelerator block for performing the function. This frees the processor to perform functions that cannot be performed by the accelerator blocks. Once the accelerator block has performed the function, it returns the processed dataset to the processor for further use.

In many instances, the SOC design includes, not only circuitry designed by the chip level integrator, but also circuitry designed by other entities (proprietary circuitry). Chip level integrators typically do not have detailed knowledge of the functioning of proprietary circuitry.

Until now, there has been no suitable way to access internal nodes of such circuitry blocks for testing purposes. Data could be examined only before or after a component, such as an accelerator block, processed data. Data could not be examined during the actual processing. This has made it difficult to test and/or understand the workings of some circuitry, particularly proprietary circuitry.

In addition, until now, a hardware system clock has had only two modes, either completely stopped or free running at a relatively high speed, e.g., 30–100 megahertz. This also has made it difficult to test and/or understand the working of such circuitry.

An example of an SOC design is the ARIES device for high speed data transmission in an asymmetric digital subscriber line (ADSL) system manufactured by Lucent Microelectronics. The ARIES device includes two DSP 16000 processor cores and four hardware accelerator blocks. Each processor has its own random access memory (RAM) and read only memory (ROM) and each has an external memory interface (EMI) bus to which hardware accelerators are attached. One DSP 16000 processor core is on the data network side of the chip along with Frame Code Interleaver (FCI) and ATM bridge chip interface (UTOPIA) accelerator blocks. The other processor core is on the client side of the chip along with Fast Fourier Transform (FFT) and multiplexed external memory interface and decimation filter (MEMI) accelerator blocks. The processor cores are manufactured by Lucent Technologies, Inc. and the FCI, UTOPIA, MEMI, and FFT are hardware accelerator blocks are manufactured by entities other than Lucent. Until now, it has been difficult for Lucent, as the chip level integrator, to test and understand the proprietary accelerator blocks which were not designed by Lucent.

Previous troubleshooting techniques included software control of hardware. One class of such techniques, Joint Test Action Group (JTAG) techniques, involves building scan chains into existing circuitry. The technique is used to scan data into and out of blocks, usually through an external JTAG port. In this manner, data could be observed as it entered or exited a block or chip (i.e., at a boundary). Such techniques can be time consuming and difficult and the need for ports and scan chains causes an area penalty on the chip.

In the software context, debugging tools are known for allowing a user to execute software instructions one at a time and to observe the status of external bus signals, such as data and address fields.

SUMMARY OF THE INVENTION

The present invention provides a method and apparatus for controlling a clock of a component of an integrated circuit for testing purposes. The clock is controlled on a hardware level. Specifically, a stepped clocking technique is provided by which a processor can advance the clock signal of a component one bit at a time or in rapid bursts of successive bits. This provides for operation of the accelerator block in increments of half-clock cycles (bit by bit). Accordingly, the accelerator block can be stopped during processing of the dataset. Registers of the accelerator block can then be interrogated by the processor, which continues to operate at full clock speed, to determine how the accelerator block is processing the data.

DETAILED DESCRIPTION

The present invention provides a method and apparatus for controlling a clock of a component, such as an accelerator block, of an integrated circuit for testing purposes. The clock is controlled on a hardware level. Specifically, a stepped clocking technique is provided by which a processor can advance, bit by bit (single step mode) or in rapid bursts of multiple bits (burst mode), the clock signal of an accelerator block. This provides phase-level granularity, i.e., operation of the accelerator block in increments of half-clock cycles (bit by bit). Accordingly, the accelerator block can be stopped during processing of the dataset. Registers of the accelerator block can then be interrogated by the processor, which continues to operate at full clock speed, to determine how the accelerator block is processing the data. The invention is therefore advantageous for the testing of electrical components in devices, such as system-on-a-chip (SOC) devices, including at least one processor and at least one accelerator block.

Figure 1:
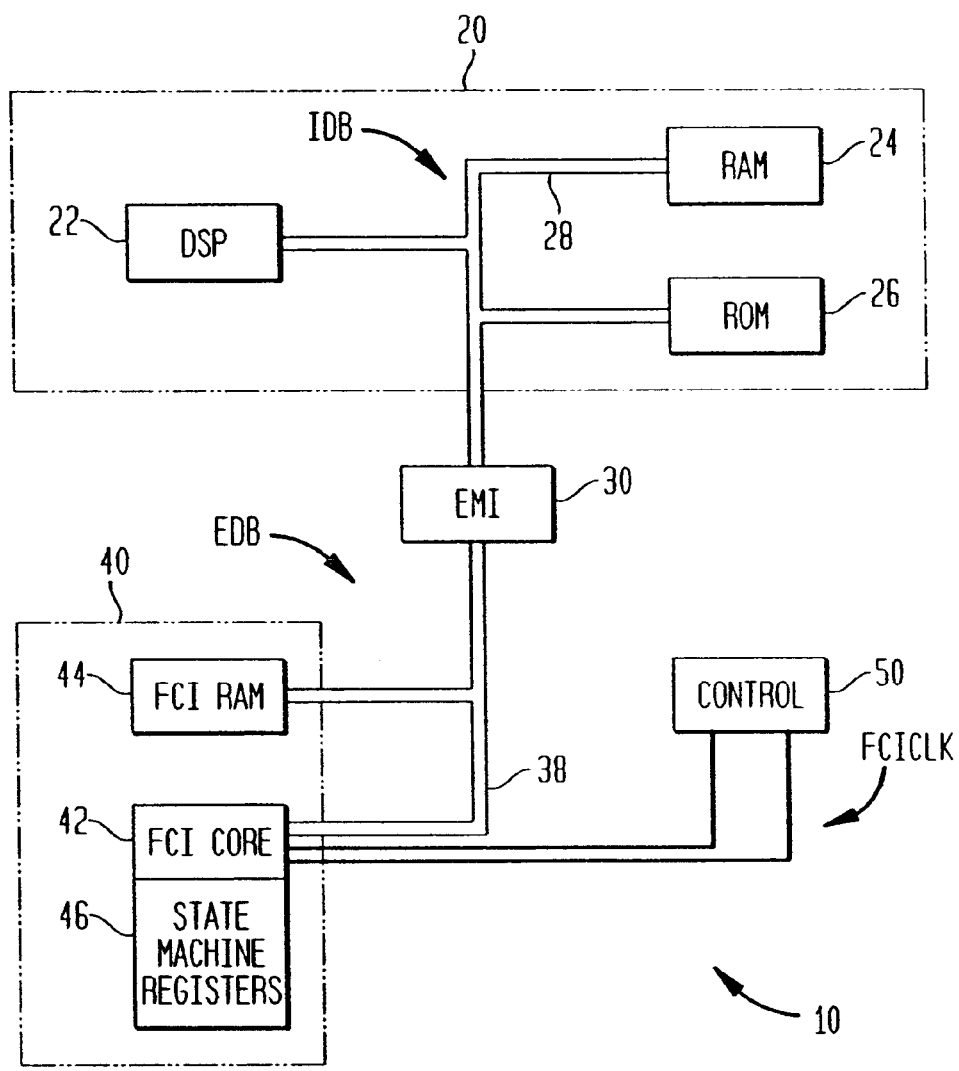
FIG. 1 is a block diagram of an exemplary integrated circuit including a processor (DSP) and an accelerator block (FCI) which is controlled by a stepped clock signal in accordance with the present invention.

By way of example, the present invention is described below with reference to a portion of the ARIES device described above. FIG. 1 is a block diagram showing an integrated circuit 10 including a processor core 20, an accelerator block 40, and a control circuit 50. The processor core 20 includes a processor (DSP) 22, random access memory (RAM) 24 and read only memory (ROM) 26 connected by an internal data bus (IDB) 28 terminating at an external memory interface (EMI) 30.

Figure 2:
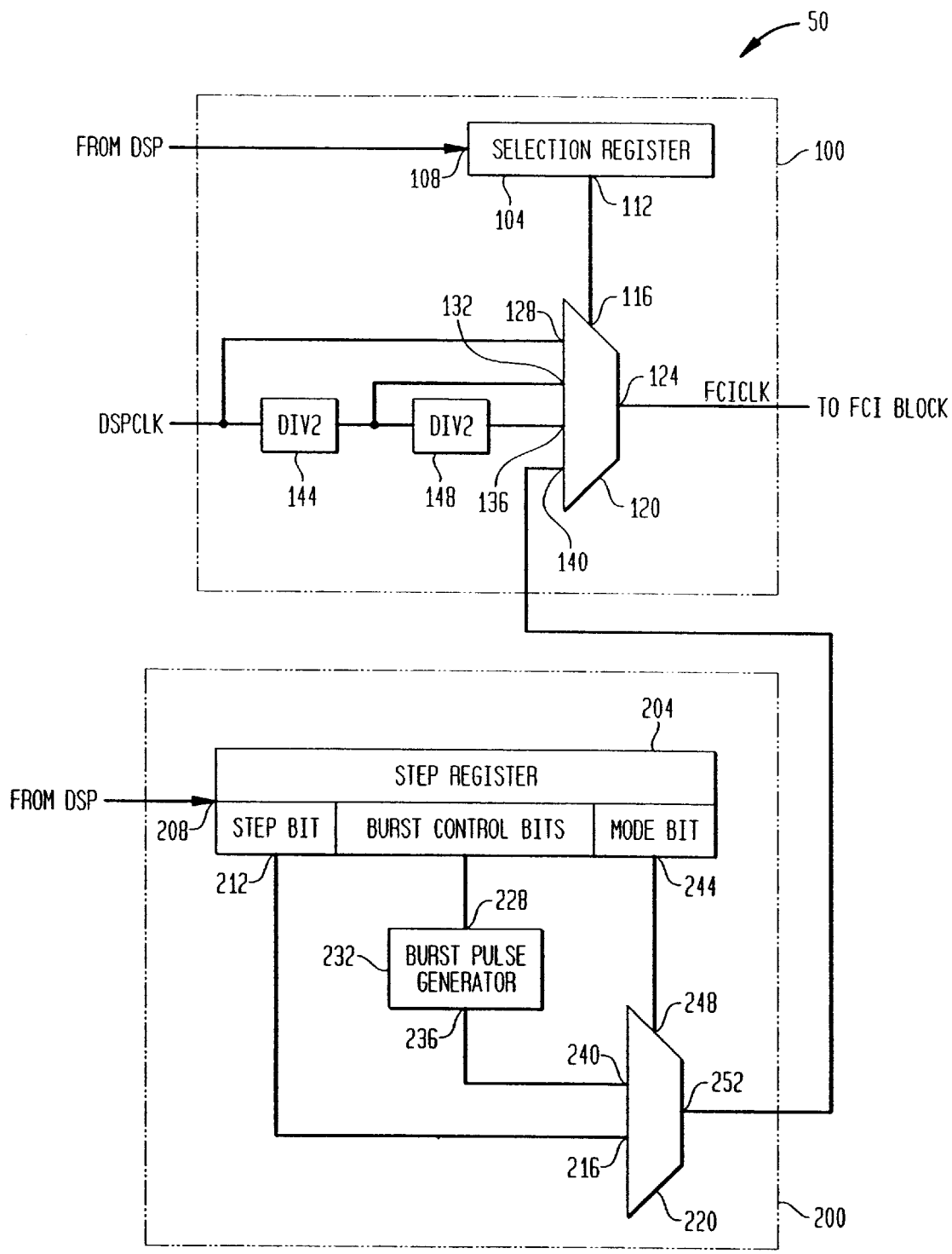
FIG. 2 is a block diagram of exemplary integrated circuitry for implementing a stepped clock for controlling an accelerator block in accordance with the present invention.

The external memory interface (EMI) 30 interfaces with an external data bus (EDB) 38 to which the FCI accelerator block (FCI block) 40 is connected. The FCI block 40 includes an FCI core 42 and random access memory (FCI RAM) 44 for use by the FCI core. The FCI core 42 includes many state machines and associated registers 46. Additional registers may be added for increased observability In accordance with the present invention, the integrated circuit 10 also includes a control circuit (CONTROL) 50. The control circuit 50 includes circuitry for generating a stepped clock signal and for selecting between free running and stepped clock signal modes. An example of a suitable control circuit 50 for controlling the clock of an accelerator block is shown in FIG. 2. As shown in FIG. 2, the control circuit 50 includes a clock selection circuit 100 and a stepped clock circuit 200. The stepped clock circuit 200 generates a stepped clock signal which is used to advance the clock of the FCI block. During normal operation, the clock selection circuit 100 directs a free-running clock signal to the FCI block. During testing, the clock selection circuit 100 directs a stepped clock signal from the stepped clock circuit 200 to the FCI block.

In this example, the stepped clock circuit 200 supports both single step mode, in which the FCI block is advanced bit by bit, and burst mode, in which the FCI block is advanced by multiple half-clock cycles. Accordingly, the stepped clock circuit 200 includes a multi-bit step register 204 having an input terminal 208 for receiving and storing bits written to the step register 204 by the processor core (DSP) 20. The step register 204 is capable of storing a step bit, burst control bits, and a burst mode bit.

The step bit is output from step register 204 on first terminal 212 and received on first input terminal 216 of mode switch 220. In this example, mode switch 220 is a two-to-one multiplexer. The step bit is used as the stepped clock signal in single step mode. The burst control bits are output from step register 204 on second terminal 224 and received on input terminal 228 of a burst pulse generator 232. The burst control bits indicate a number of half-clock cycles desired per burst in burst mode. The burst pulse generator 232 creates a burst mode stepped clock signal including the appropriate number of half-clock cycles. The burst mode stepped clock signal includes bits which are transmitted at the usual, free-running clock speed and is output from burst pulse generator 232 on output terminal 236 and received on second input terminal 240 of the switch 220. The mode bit is output from the step register 204 on terminal 244 and received on control terminal 248 of mode switch 220. Therefore, the mode switch 220 is controlled to pass to its output terminal 252 either the single step mode or burst mode stepped clock signal from the clock circuit 200.

The control circuit 50 also includes a clock selection circuit 100 for selecting a clock signal. The clock selection circuit 100 includes a selection register 104 having an input terminal 108 for receiving and storing clock selection bits received from the processor DSP 22. The clock selection bits are output from the selection register 104 on output terminal 112 and fed to a control terminal 116 of a source switch 120. An output terminal 124 of the source switch 120 is connected to the clock terminal (not shown) of the FCI block. The source switch 120 also has input terminals for receiving a free-running and a stepped clock signal. Clock selection bits written to the selection register 104 control the source switch 120 to determine whether a free-running or stepped clock signal is passed to the FCI block.

In this example, the source switch 120 is a four-to-one multiplexer having first 128, second 132, third 136 and fourth 140 input terminals. The full-speed clock signal (DSPCLK) for the processor (DSP) 22 is received on input terminal 128 of the source switch 120. Half-speed and quarter-speed clock signals are derived using bit programmable dividers 144, 148. These clock signals are received on input terminals 132 and 136 respectively of the source switch 120. The stepped clock signal from the stepped clock circuit 200 is received on the fourth input terminal 140 of the source switch 120. Accordingly, the processor 22 can direct either full-speed, half-speed, quarter-speed, or stepped clock signals to the FCI block by writing appropriate clock selection bits to the selection register 104 to control the clock source selection switch 120.

In use, the control circuit 50 shown in FIG. 2 works as follows. Under normal operation, the processor 22 may write clock selection bits, e.g., 11, 01, or 10, to the selection register 104 to cause full-speed, half-speed or quarter-speed free running clock signals to be passed by source switch 120 to the FCI block. During testing, the processor 22 writes clock selection bits, e.g., 00, to the selection register 104 to cause the source switch 120 to pass to the FCI block the stepped clock signal received from the stepped clock circuit 200 on the fourth input terminal 140.

The stepped clock signal controls the FCI block. For example, by writing a 1 to the FCI block, the FCI block is advanced one half clock cycle. By writing a 0 to the FCI block, the FCI block is advanced another half clock cycle. After advancement of the FCI block, the processor 22, which is still running at full speed, can interrogate state machine registers 46 or the FCI RAM 44 memory within the FCI block 40 to see how a dataset is being processed. This provides details as to the operation of the accelerator block.

In single step mode, the clock of the FCI block is advanced one half clock cycle at a time by writing a single bit to a clock terminal of the FCI block 40 via the step register 204. In the example of FIG. 2, the processor writes a step bit, e.g., a 1, and a mode bit, e.g., a 0, to the step register 204. The mode bit is fed to the control terminal 248 of the mode switch 220 to cause the mode switch 220 to pass to its output terminal 252 the single step mode stepped clock signal received on its first input terminal 216. The step bit is thereby written to the step register 204 and sent to the clock terminal of the FCI block via source switch 120 of the clock selection circuit 100, the operation of which is discussed below. By writing alternating 1 and 0 step bits to the step register, the processor toggles the clock signal to the accelerator block. By pausing after each step bit is written, the accelerator block can be examined in increments of half-clock cycles.

Alternatively, the clock of the FCI block may be advanced in burst mode. In burst mode, the processor 22 writes to the step register 204 a mode bit and burst control bits. The mode bit is fed from output terminal 244 of step register 204 to the control terminal 248 of the mode switch 220. This causes the mode switch 220 to pass to its output terminal 252 the burst mode stepped clock signal received on its second input terminal 240. The burst control bits indicate a number of bits per burst and are fed from the step register 204 to the input terminal 228 of the burst pulse generator circuit 232. Optionally, the burst control bits may include a self-clearing "go" bit for initiating burst mode. The burst pulse generator circuit 232 generates a burst mode stepped clock signal including the appropriate number of half clock cycles and outputs the burst mode stepped clock signal to the second input terminal 240 of the mode switch 220. For example, if the burst control bits indicate a burst size of five half clock cycles, the burst pulse generator will generate five sequential clock pulses, e.g., a string of 5 alternating bits, such as 10101. The burst mode stepped clock signal is passed to the output terminal 252 of mode switch 220 to the clock terminal of the FCI block via the source switch 120 of the clock selection circuit 100.

Burst mode may be advantageous, for example, to align the number of half cycles in a burst with a software function, such as a processor instruction, for testing purposes. As compared to single step mode, burst mode provides a rapid succession of clock cycles for accelerating the testing process.

In an alternate embodiment, the control circuit 50 may be capable of single step mode only. In such an embodiment, the stepped clock circuit 200 includes a single bit step register, such as a D-type flip flop, and omits the burst pulse generator and mode switch. In single step mode, the step bits written to the register become the stepped clock signal for controlling the FCI block.

In alternate embodiments, it may be advantageous to set up a register for receiving bits to control a switch within the control block. By doing so, the switch can be controlled to select signals from various internal observable nodes to be brought out to package pins where the output may be observed, for example with the use of an oscilloscope. In another embodiment, for testing purposes, the processor may be configured to execute certain programs depending upon values that are read back from the accelerator block. The processor 22 may also test the FCI block by writing data to the FCI RAM 44 or state machine registers 46 of the stopped FCI block to observe the results.

It should be noted that bus holders are required to hold data on the tri-state bus when the free running clock signal is deselected and the stepped clock signal is selected. Use of bus holders is well known in the art. Additional test registers internal to the FCI core have been added to the FCI block to allow for enhanced observability and interrogation of the FCI block during processing of the data.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention.

Accordingly, the foregoing description is by way of example only, and not limiting. The invention is limited only as defined in the following claims and equivalents thereto.

What is claimed is:

1. A circuit for generating a clock signal, said circuit comprising:
  a step register having an input and a first, second, and third outputs, wherein said step register comprises:
    a step bit position for storing a step bit, said step bit position coupled to said first output;
    at least one burst control bit position, said at least one burst control bit position coupled to said second output; and
    a mode bit position, said mode bit position coupled to said third output;
  a burst pulse generator having an input and an output, said input coupled with said second output of said step register to receive said at least one burst control bit, said burst pulse generator adapted to generate a number of stepped half clock pulses, said number specified by said at least one burst control bit; and
  a first switch having first, second, and third inputs and an output, said first input coupled to said first output of said step register to receive said step bit, said second input coupled to said third output of said step register to receive said mode bit, and said third input coupled to said output of said burst pulse generator to receive said number of stepped half clock pulses, wherein said output of said first switch is controlled by said mode bit to output either said step bit or said number of stepped half clock pulses as said clock signal.

2. A circuit as set forth in claim 1, further comprising:
  a clock selection circuit having a second switch, said second switch having a first and a second input, an output, and at least one third input coupled to at least one clock; wherein said first input is coupled to said output of said first switch;
  a selection register comprising an input, an output, and at least one selection bit position, said output coupled to said second input of said second switch;
  wherein said second switch selects either its first or third input responsive to said at least one selection bit.

3. A circuit as set forth in claim 2, wherein said at least one third input comprises a plurality of third inputs coupled to a corresponding plurality of clocks.

4. A circuit as set forth in claim 3, further comprising a clock divider circuit having an input and a plurality of outputs, said plurality of outputs coupled to said plurality of third inputs of said second switch, wherein said clock divider circuit comprises:
  a first clock coupled to said input;
  at least one programmable divider for dividing said first clock into a plurality of clocks, wherein each clock is coupled to one of said plurality of outputs.

5. A circuit as set forth in claim 1, wherein said input of said step register is coupled to a processor for providing said step bit.

6. A circuit as set forth in claim 2, wherein said selection register is coupled to a processor for providing said at least one selection bit.

7. A circuit for generating a clock signal, said circuit comprising:
  a step register having an input and an output, wherein said step register comprises:
    a step bit position for storing a step bit, said step bit position coupled to said output to output a single half clock pulse;
  a clock selection circuit having a switch, said switch having an output and a first and a second input and at least one third input, said third input coupled to at least one clock, wherein said first input is coupled to said output of said step register;
  a selection register comprising an input, an output, and at least one selection bit position for receiving a selection bit, said output coupled to said second input of said switch;
  wherein said switch selects either its first input representing a single half clock pulse or its third input representing one of at least one clock responsive to said at least one selection bit.

8. A circuit as set forth in claim 7, wherein said at least one third input comprises a plurality of third inputs coupled to a corresponding plurality of clocks.

9. A circuit as set forth in claim 8, further comprising a clock divider circuit having an input and a plurality of outputs, said plurality of outputs coupled to said plurality of third inputs of said switch, wherein said clock divider circuit comprises:
  a first clock coupled to said input;
  at least one programmable divider for dividing said first clock into a plurality of clocks, wherein each clock is coupled to one of said plurality of outputs.

10. A circuit as set forth in claim 7, wherein said first input of said step register is coupled to a processor for providing said step bit.

11. A circuit as set forth in claim 7, wherein said step register is a D-type flip flop.

12. A circuit as set forth in claim 7, wherein said input of said selection register is coupled to a processor for providing said at least one selection bit.

13. A method of generating a clock signal comprising the steps of:

(a) providing a step bit, a mode bit, and at least one burst control bit to a step register;

(b) generating a number of stepped half clock pulses, said number corresponding to said at least one burst control bit;

(c) selecting either said step bit or said number of stepped half clocked pulses responsive to said mode bit.

14. A method as set forth in claim 13, further comprising the steps of:

(d) providing at least one free running clock signal;

(e) further selecting either said signal provided in step (d) or said signal selected in step (c) to be output as said generated clock signal.

15. A method as set forth in claim 14, wherein step (e) is performed using a switch controlled by a selection register.

16. The method of claim 15, further comprising the step of controlling said selection register with a processor.

17. A method of generating a clock signal comprising the steps of:

(a) providing a step bit to a step register;

(b) providing at least one free running clock signal;

(c) selecting either said step bit or said at least one free running clock signal; and (d) outputting said selection as said generated clock signal, wherein said output is either said free running clock signal or a single stepped half clock pulse determined by said step bit.

18. A method as set forth in claim 17, wherein step (c) is performed using a switch controlled by a selection register containing at least one selection bit.

19. A method as set forth in claim 18, further comprising the step of:

(e) generating said selection bit with a processor.

* * * * *